United States Patent [19]
Cummins et al.

[11] Patent Number: 5,944,474
[45] Date of Patent: *Aug. 31, 1999

[54] SUPPORT FOR A CYLINDRICAL CONTAINER

[75] Inventors: Millard M. Cummins, Bexley; David T. Jones, Columbus, both of Ohio

[73] Assignee: Drum Runner Material Handling Co., Columbus, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/790,278

[22] Filed: Jan. 28, 1997

[51] Int. Cl.$^6$ ....................................................... B62B 3/04
[52] U.S. Cl. ........................ 414/621; 294/119.2; 414/448; 414/449; 414/460; 414/911
[58] Field of Search ..................................... 414/420, 444, 414/448, 449, 490, 621, 911, 422, 460; 294/31.2, 119.2; 280/79.5, 79.6

[56] References Cited

U.S. PATENT DOCUMENTS

| | | | |
|---|---|---|---|
| 1,379,472 | 5/1921 | Morgan et al. | 414/449 X |
| 2,292,310 | 8/1942 | Wilkins | 294/31.2 X |
| 2,654,493 | 10/1953 | Kernkamp | 414/448 |
| 2,708,048 | 5/1955 | Hopfeld . | |
| 2,831,720 | 4/1958 | Renfroe | 294/31.2 |
| 2,832,630 | 4/1958 | Sterling | 414/448 X |
| 3,052,441 | 9/1962 | Fleischman | 248/141 |
| 3,768,954 | 10/1973 | Marsh et al. | 414/621 X |
| 4,009,898 | 3/1977 | Hampton | 294/119.2 X |
| 4,084,706 | 4/1978 | Russell . | |
| 4,460,028 | 7/1984 | Henry . | |
| 4,536,123 | 8/1985 | Snyder . | |
| 5,257,890 | 11/1993 | Vickary | 414/420 |
| 5,344,278 | 9/1994 | Emig, Jr. . | |
| 5,406,996 | 4/1995 | Wagner et al. | 414/621 X |
| 5,482,421 | 1/1996 | Cummins et al. . | |
| 5,501,497 | 3/1996 | Holloway | 294/119.2 X |
| 5,658,118 | 8/1997 | Luca | 414/448 X |

FOREIGN PATENT DOCUMENTS

94/20350  9/1994  WIPO ................................... 280/79.6

*Primary Examiner*—James W. Keenan
*Attorney, Agent, or Firm*—John L. Gray; Kegler, Brown, Hill & Ritter, L.P.A.

[57] ABSTRACT

A support for a cylindrical container adapted to engage said container at its mid-section and containing a rapid connect and disconnect flexible member adapted to pull together two hinged semi-circular members to permit the container to be firmly held in position.

2 Claims, 3 Drawing Sheets

5,944,474

SUPPORT FOR A CYLINDRICAL CONTAINER

BACKGROUND OF THE INVENTION

In moving and tilting cylindrical containers, devices have been developed such as shown in application Ser. No. 08/524,595, entitled "COMBINATION CARRIER, TILTING AND OPTIONAL FORCE MEASURING DEVICE", now abandoned. In order to lift the cylindrical container, it is necessary to grasp it firmly around its middle. This is especially true if the container is to be tilted for pouring purposes. A number of devices have been developed for this purpose as is set forth in the Information Disclosure Statement but none of them possess the quick attach and release characteristics of the instant invention.

BRIEF SUMMARY OF THE INVENTION

This invention relates to a device that will encircle a cylindrical container and which in place may be attached to a mechanism for lifting and tilting said cylindrical container once firmly encircled. The instant invention permits a number of different diameter containers to be held and quickly and easily secured or unsecured. It is therefore an object of this invention to provide a support for a cylindrical container which will be readily removable from said container and which will enable the container to be readily secured for lifting, transporting, tilting, and weighing purposes.

This together with other objects and advantages of the invention will become more readily apparent to those skilled in the art when the following general statements and descriptions are read in the light of the appended drawings.

DETAILED DESCRIPTION OF THE INVENTION

Figure 1:
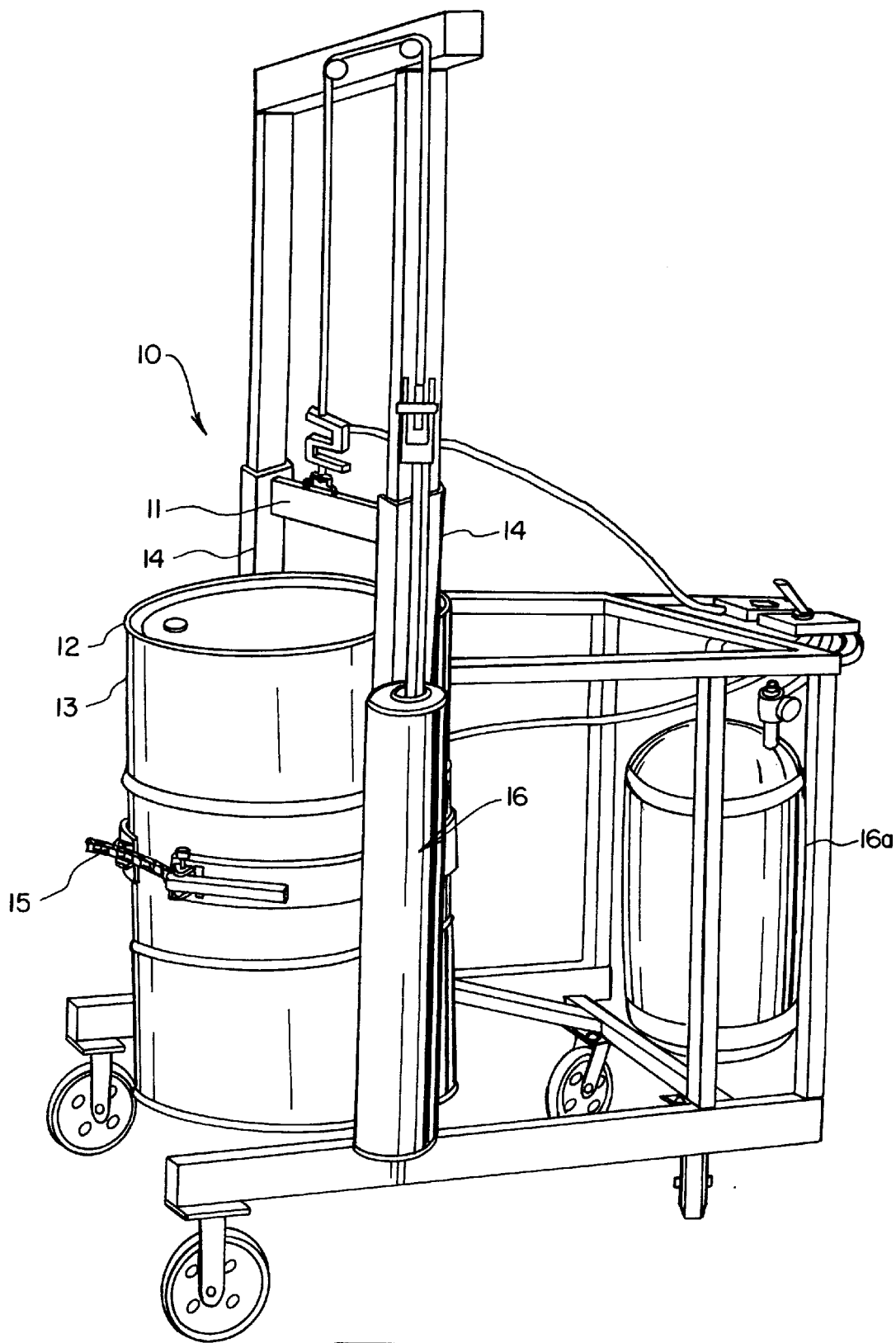
FIG. 1 is a perspective view of a cylindrical container transporting and weighing device such as shown in abandoned application Ser. No. 08/524,595, entitled "COMBINATION CARRIER, TILTING AND OPTIONAL FORCE MEASURING DEVICE" with applicants' invention used to encircle and support the container.

Referring now more particularly to FIG. 1, a combination drum lifter and transporter with an integral force measuring device such as shown in U.S. Pat. No. 5,482,421 is shown generally at 10. The lifting mechanism 11, rather than engaging the upper lip 12 of the drum 13 as in U.S. Pat. No. 5,482,421, is attached to side arms 14—14 (See FIG. 2), which in turn are attached to the support device shown generally at 15 of this invention. Thus, when the support device 15 is secured and when the lifting device 11 is actuated by the air cylinder 16, drawing air from the reservoir 16a, the drum 13 is lifted.

Figure 2:
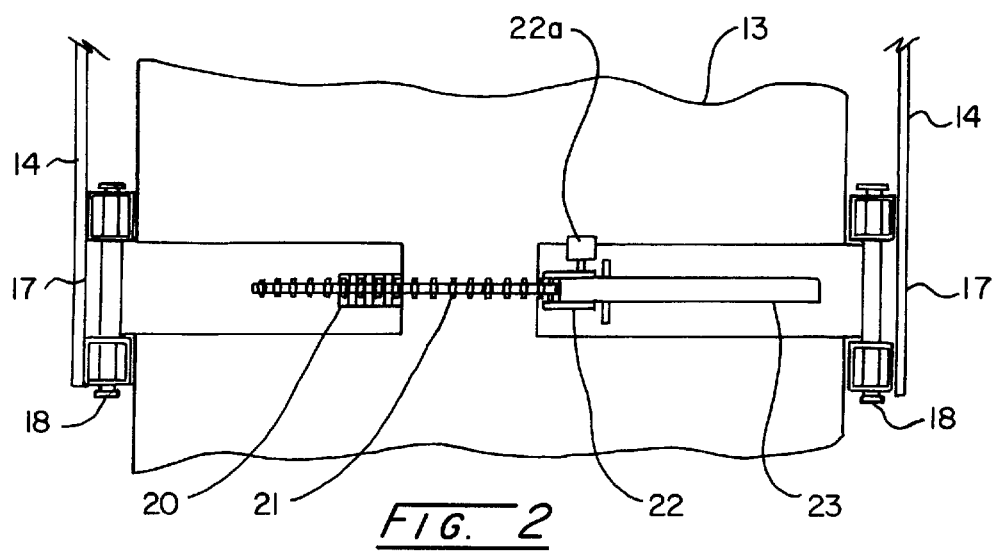
FIG. 2 is a side-elevation view of the detail of applicants' invention attached to a cylindrical container.
Figure 3:
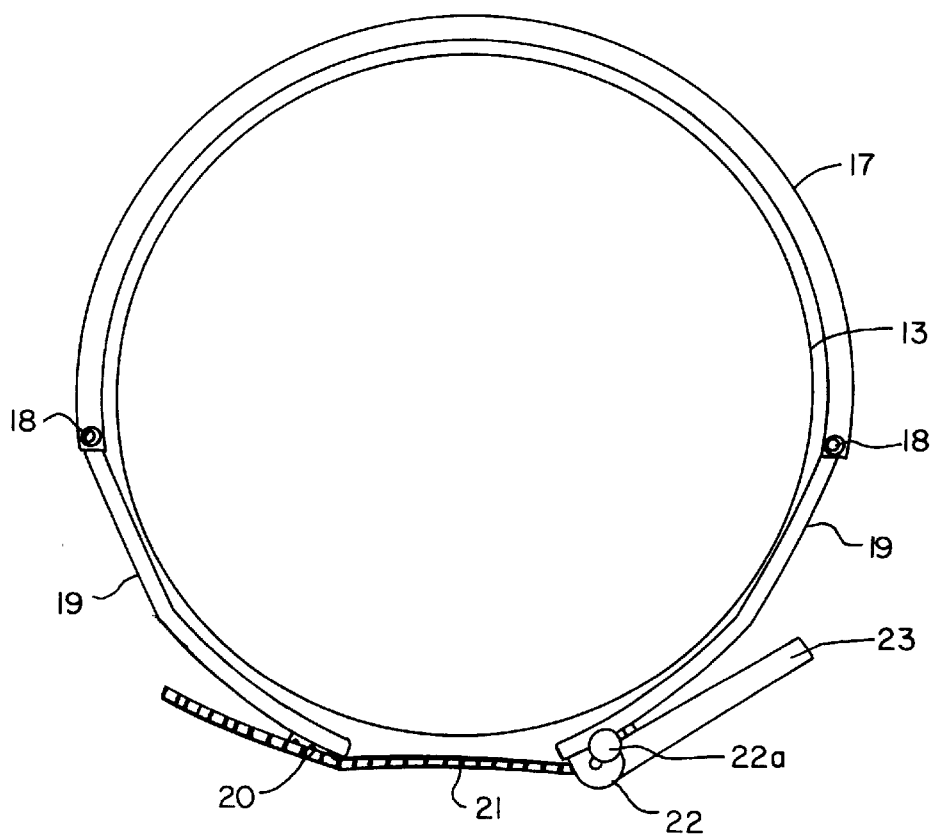
FIG. 3 is a top-plan view showing applicants' invention encircling a container.
Figure 4:
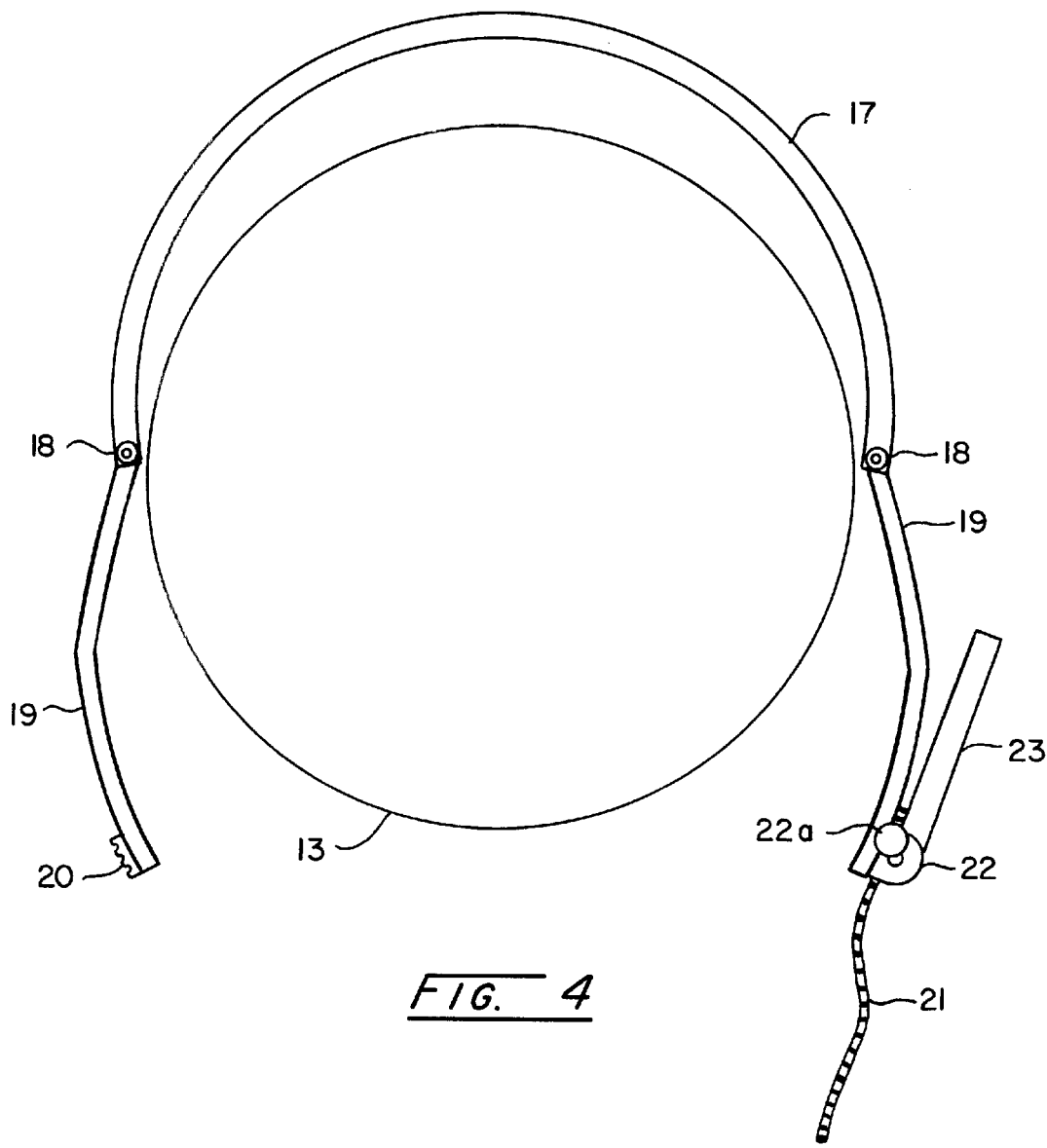
FIG. 4 is a top-plan view showing applicants' invention adjacent a container but not attached thereto.

Referring now to FIGS. 2 and 3, the vertical members 14—14 are shown fixedly attached to semi-circular member 17, which partially encircles the drum 13. At each end of semi-circular member 17, there are hinges 18—18 to which are attached shorter semi-circular members 19—19, which when closed further encircle the drum 13. The other end of one of the members 19 is provided with a fixed protrusion 20 which is adapted to engage the flexible member 21 at any one of a number of locations thereon. Member 21 can be a chain. A bicycle chain, for example, works well. Any other sort of flexible member that has preferably equal-spaced indentations adapted to engage the member 20 will be satisfactory. In operation, the device carrying the support for the cylindrical container is moved up to the cylindrical container 13 as shown in FIG. 4 until the semi-circular member 17 is in place abutting the container 13. The two shorter semi-circular members 19 are then pushed together, the flexible member 21 is attached to the protrusion 20, the lever arm 23 is rotated on support 22 so as to tighten to the position shown in FIGS. 3 and 4 from a position essentially perpendicalar to a tangent to the cylindrical member 13 at support 22, thus tightening the semi-circular member 17, the shorter semi-circular members 19, and the flexible member 21 so that the drum is held securely. The lever 23 is rotated over center so as to stay in place. Safety pin 22a prevents accidental release of lever 23. When it is desired to disengage the support from the drum, safety pin 22a is disengaged and lever 23 is merely rotated to a position so that it is perpendicalar to a tangent to the drum at support 22 thus loosening flexible member 21 so that one end of it may be disengaged from protrusion 20 and the shorter semi-circular members 19—19 may be rotated outward. Then semi-circular member 17 may be withdrawn from around the cylindrical container 13.

While this invention has been described in this provided embodiment, it is to be appreciated that variations therefrom may be made without departing from the true scope and spirit of the invention.

What is claimed is:

1. A support for a cylindrical container which is adapted to encircle said container and comprising:

a rigid semi-circular member, a pair of shorter semi-circular members, one of said shorter semi-circular members being hingedly attached at one end to one end of said rigid semi-circular member, and the other of said shorter semi-circular members being hingedly attached at one end to the other end of said rigid semi-circular member, one of said shorter semi-circular members being provided at its unattached end with a catch and a lever arm, a chain composed of a series of links and having one end of said chain securely attached to said catch, the other of said shorter semi-circular members being provided at its unattached end with a fixed protrusion extending outwardly from said shorter semi-circular member and being of such a shape as to engage a link of said chain and hold said chain against lateral movement, whereby, when said support is placed around a cylindrical container and the unattached end of said chain has one of its links engaging said fixed protrusion, said lever arm may be rotated thus moving said catch and tightening said rigid semi-circular member, said pair of shorter semi-circular members, and said flexible member around said cylindrical container.

2. A combination carrier and tilting device for a cylindrical container comprising:

a carrier body provided with wheels for moving said carrier body readily on a surface, a frame vertically extending from said carrier body and having at least two side members and a top member, a horizontally extending lift member, vertically extending side supports attached to said lift member and adapted to slidably cooperate with said side members of said vertically extending frame, a rigid semi-circular member rotatably attached at each end thereof to said vertically extending side supports, a pair of shorter semi-circular members, one of said shorter semi-circular members being hingedly attached at one end to one end of said rigid semi-circular member, and the other of said shorter semi-circular members being hingedly attached at the other end to the other end of said rigid semi-circular member, one of said shorter semi-circular members being provided at its unattached end with a catch and a lever, a chain composed of a series of links and having one end of said chain securely attached to said catch, the other of said shorter semi-circular members being provided at its unattached end with a fixed protrusion extending outwardly from shorter semi-circular member and being of such a shape as to engage a link of said chain and hold said chain against lateral movement, whereby, when said support is placed around a cylindrical container and the unattached end of said chain has one of its links engaging said fixed protrusion, said lever arm may be rotated thus moving said catch and tightening said rigid semi-circular member, said pair of shorter semi-circular members, and said flexible member around said cylindrical container, pneumatic means using stored air for raising and lowering said lift member, a manual control for controlling said pneumatic means, and said pneumatic means being connected to said lift member through said top member of said frame.

\* \* \* \* \*